United States Patent
Ikeda et al.

(10) Patent No.: US 11,119,374 B2
(45) Date of Patent: Sep. 14, 2021

(54) DISPLAY DEVICE

(71) Applicant: Japan Display Inc., Minato-ku (JP)

(72) Inventors: Kojiro Ikeda, Tokyo (JP); Kentaro Okuyama, Tokyo (JP); Tenfu Nakamura, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/808,532

(22) Filed: Mar. 4, 2020

(65) Prior Publication Data

US 2020/0292896 A1 Sep. 17, 2020

(30) Foreign Application Priority Data

Mar. 11, 2019 (JP) .............................. JP2019-043826

(51) Int. Cl.
G02F 1/1333 (2006.01)
G02F 1/1362 (2006.01)
G09G 3/36 (2006.01)
(52) U.S. Cl.
CPC .. G02F 1/136286 (2013.01); G02F 1/133365 (2013.01); G02F 1/136213 (2013.01); G09G 3/3677 (2013.01); *G02F 1/136295* (2021.01)
(58) Field of Classification Search
CPC .. G02F 1/1334; G02F 1/1347; G02F 1/13471; G02F 1/13476; G02F 1/133365; G02F 1/136286
See application file for complete search history.

(56) References Cited

U.S. PATENT DOCUMENTS

| 2008/0024705 | A1* | 1/2008 | Hasegawa | G02F 1/1395 349/123 |
| 2011/0249221 | A1 | 10/2011 | Uchida et al. | |
| 2013/0258711 | A1* | 10/2013 | Okuyama | G02F 1/133615 362/611 |
| 2017/0038643 | A1* | 2/2017 | Huang | C09K 19/56 |

FOREIGN PATENT DOCUMENTS

JP 2012-151081 A 8/2012

* cited by examiner

*Primary Examiner* — Mariam Qureshi
(74) *Attorney, Agent, or Firm* — Oblon, McClelland, Maier & Neustadt, L.L.P.

(57) ABSTRACT

According to one embodiment, a display device includes a liquid crystal layer between a first substrate and a second substrate. The first substrate includes a wiring line and a pixel electrode. The liquid crystal layer contains a stripe-shaped polymer extending in a first direction and a liquid crystal molecule. The liquid crystal layer contains a first polymer in an area overlapping the wiring line and a second polymer in an area overlapping the pixel electrode. The first polymer includes a first portion extending in a direction different from the first direction. The second polymer includes a second portion extending in a direction different from the first direction. A density of the first portion is higher than a density of the second portion.

5 Claims, 7 Drawing Sheets

DISPLAY DEVICE

CROSS-REFERENCE TO RELATED APPLICATIONS

This application is based upon and claims the benefit of priority from Japanese Patent Application No. 2019-043826, filed Mar. 11, 2019, the entire contents of which are incorporated herein by reference.

FIELD

Embodiments described herein relate generally to a display device.

BACKGROUND

Recently, various illumination devices including light modulation elements which exhibit scattering properties or transparent properties with respect to light have been proposed. For example, the light modulation element includes a polymer dispersed liquid crystal layer as a light modulation layer. The light modulation element is disposed behind a light guide and scatters light which enters from a side surface of the light guide.

DETAILED DESCRIPTION

Figure 1:
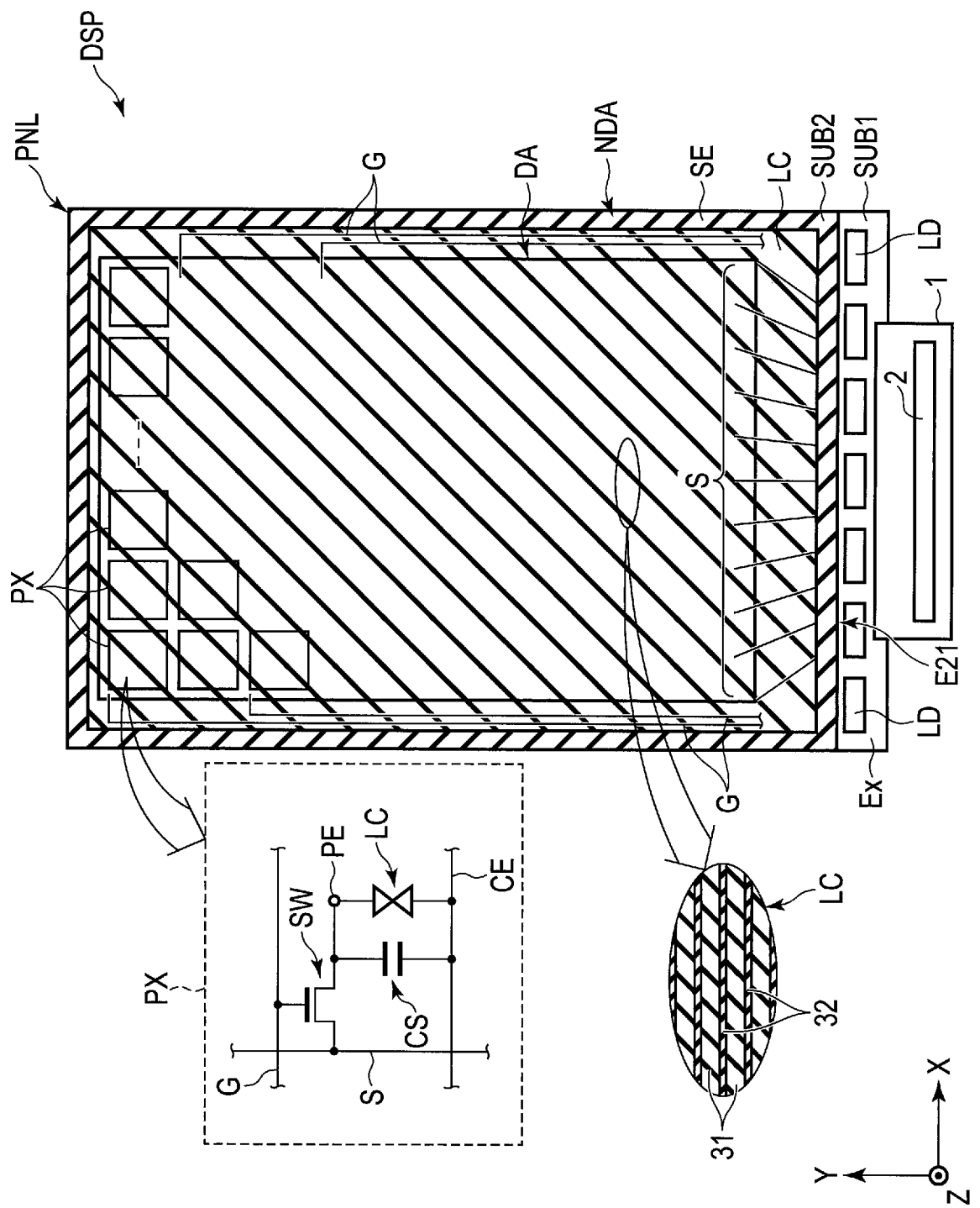
FIG. 1 is a plan view showing a configuration example of a display device DSP of the present embodiment.

In general, according to one embodiment, there is provided a display device including a light-emitting element, a first substrate, a second substrate, and a liquid crystal layer. The first substrate includes a first transparent substrate, a wiring line located above the first transparent substrate, a switching element electrically connected to the wiring line, and a pixel electrode electrically connected to the switching element. The second substrate includes a second transparent substrate having a side surface facing the light-emitting element, and a common electrode overlapping the pixel electrode. The liquid crystal layer is located between the first substrate and the second substrate, and contains a stripe-shaped polymer extending in a first direction and a liquid crystal molecule. The liquid crystal layer contains a first polymer in an area overlapping the wiring line and a second polymer in an area overlapping the pixel electrode. The first polymer includes a first portion extending in a direction different from the first direction. The second polymer includes a second portion extending in a direction different from the first direction. A density of the first portion is higher than a density of the second portion.

According to another embodiment, there is provided a display device including a light-emitting element, a first substrate, a second substrate, and a liquid crystal layer. The first substrate includes a first transparent substrate, a grid-shaped insulating film located above the first transparent substrate and defining an opening, and a pixel electrode located in the opening. The second substrate includes a second transparent substrate having a side surface facing the light-emitting element, and a common electrode overlapping the pixel electrode. The liquid crystal layer is located between the first substrate and the second substrate, and contains a stripe-shaped polymer extending in a first direction and a liquid crystal molecule. The liquid crystal layer contains a first polymer in an area overlapping the insulating film and a second polymer in an area overlapping the opening. A density of the first polymer is higher than a density of the second polymer.

The present embodiment will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, and the like of the respective parts are illustrated schematically in the drawings, rather than as an accurate representation of what is implemented, but such schematic illustration is merely exemplary, and in no way restricts the interpretation of the invention. Furthermore, in the specification and drawings, structural elements which function in the same or a similar manner to those described in connection with preceding drawings are denoted by the same reference numbers, and detailed explanations of them that are considered redundant may be arbitrarily omitted.

FIG. 1 is a plan view showing a configuration example of a display device DSP of the present embodiment. A first direction X, a second direction Y and a third direction Z are, for example, orthogonal to one another but may cross at an angle other than 90 degrees. The first direction X and the second direction Y correspond to directions parallel to the main surface of a substrate constituting the display device DSP, and the third direction Z corresponds to the thickness direction of the display device DSP. In the present embodiment, viewing an X-Y plane defined by the first direction X and the second direction Y will be referred to as planar view.

In the present embodiment, a liquid crystal display device employing polymer dispersed liquid crystal will be described as an example of the display device DSP. The display device DSP includes a display panel PNL, a wiring substrate 1, an IC chip 2 and a plurality of light-emitting elements LD.

The display panel PNL includes a first substrate SUB1, a second substrate SUB2, a liquid crystal layer LC and a sealant SE. Each of the first substrate SUB1 and the second substrate SUB2 has the shape of a flat plate parallel to the X-Y plane. The first substrate SUB1 and the second substrate SUB2 overlap in planar view. The first substrate SUB1 and the second substrate SUB2 are bonded together by a sealant SE. The liquid crystal layer LC is held between the first substrate SUB1 and the second substrate SUB2 and is sealed in by the sealant SE. In FIG. 1, the liquid crystal layer LC and the sealant SE are indicated by different diagonal lines.

As shown in an enlarged schematic view within FIG. 1, the liquid crystal layer LC includes polymer dispersed liquid crystal containing polymers 31 and liquid crystal molecules 32. For example, the polymers 31 are liquid crystal polymers. The polymers 31 have the shape of a stripe extending in the first direction X and are arranged in the second direction Y. The liquid crystal molecules 32 are dispersed in the gaps of the polymers 31 and are aligned such that major axes of them become parallel to the first direction X. The polymers 31 and the liquid crystal molecules 32 have optical anisotropy or refractive anisotropy. The responsiveness to an electric field of the polymers 31 is lower than the responsiveness to an electric field of the liquid crystal molecules 32.

For example, the alignment direction of the polymers 31 hardly changes regardless of the presence or absence of an electric field. On the other hand, the alignment direction of the liquid crystal molecules 32 changes according to an electric field in a state where a high voltage of greater than or equal to a threshold value is applied to the liquid crystal layer LC. In a state where voltage is not applied to the liquid crystal layer LC, the optical axis of the polymer 31 and the optical axis of the liquid crystal molecule 32 are parallel to each other, and light which enters the liquid crystal layer LC is transmitted through the liquid crystal layer LC and is hardly scattered in the liquid crystal layer LC (transparent state). In a state where voltage is applied to the liquid crystal layer LC, the optical axis of the polymer 31 and the optical axis of the liquid crystal molecule 32 cross each other, and light which enters the liquid crystal layer LC is scattered in the liquid crystal layer LC (scattering state).

The display panel PNL includes a display portion DA in which an image is displayed, and a frame-shaped non-display portion NDA which surrounds the display portion DA. The sealant SE is located in the non-display portion NDA. The display portion DA includes pixels PX arrayed in a matrix in the first direction X and the second direction Y.

As shown in an enlarged view within FIG. 1, each pixel PX includes a switching element SW, a pixel electrode PE, a common electrode CE, a liquid crystal layer LC and the like. The switching element SW is composed of, for example, a thin-film transistor (TFT) and is electrically connected to a scanning line G and a signal line S. The scanning line G is electrically connected to the switching elements SW disposed respectively in the pixels PX arranged in the first direction X. The signal line S is electrically connected to the switching elements SW disposed respectively in the pixels PX arranged in the second direction Y. The pixel electrode PE is electrically connected to the switching element SW. The common electrode CE is commonly disposed for the pixel electrodes PE. Each pixel electrode PE faces the common electrode CE in the third direction Z. The liquid crystal layer LC (more specifically, the liquid crystal molecules 32) is driven by an electric field generated between the pixel electrode PE and the common electrode CE. Capacitance CS is formed, for example, between an electrode having the same potential as the common electrode CE and an electrode having the same potential as the pixel electrode PE.

As will be described later, the scanning line G, the signal line S, the switching element SW and the pixel electrode PE are disposed in the first substrate SUB1, and the common electrode CE is disposed in the second substrate SUB2. In the first substrate SUB1, the scanning line G and the signal line S are electrically connected to the wiring substrate 1 or the IC chip 2.

The wiring substrate 1 is mounted on an extension portion Ex of the first substrate SUB1. The extension portion Ex corresponds to part of the first substrate SUB1 which does not overlap the second substrate SUB2. The wiring substrate 1 is, for example, a bendable flexible printed circuit. The IC chip 2 is mounted on the wiring substrate 1. In the IC chip 2, for example, a display driver which outputs a signal necessary for image display is incorporated. Note that the IC chip 2 may be mounted on the extension portion Ex.

The light-emitting elements LD overlap the extension portion Ex in planar view. The light-emitting elements LD are spaced apart from one another and are arranged in the first direction X. Each light-emitting element LD is, for example, a light-emitting diode, and although not described in detail, each light-emitting element LD includes a red light-emitting portion, a green light-emitting portion and a blue light-emitting portion. These light-emitting elements LD are arranged along an end portion E21 of the second substrate SUB2 and emit light toward the end portion E21. The end portion E21 extends in the first direction X in planar view.

Figure 2:
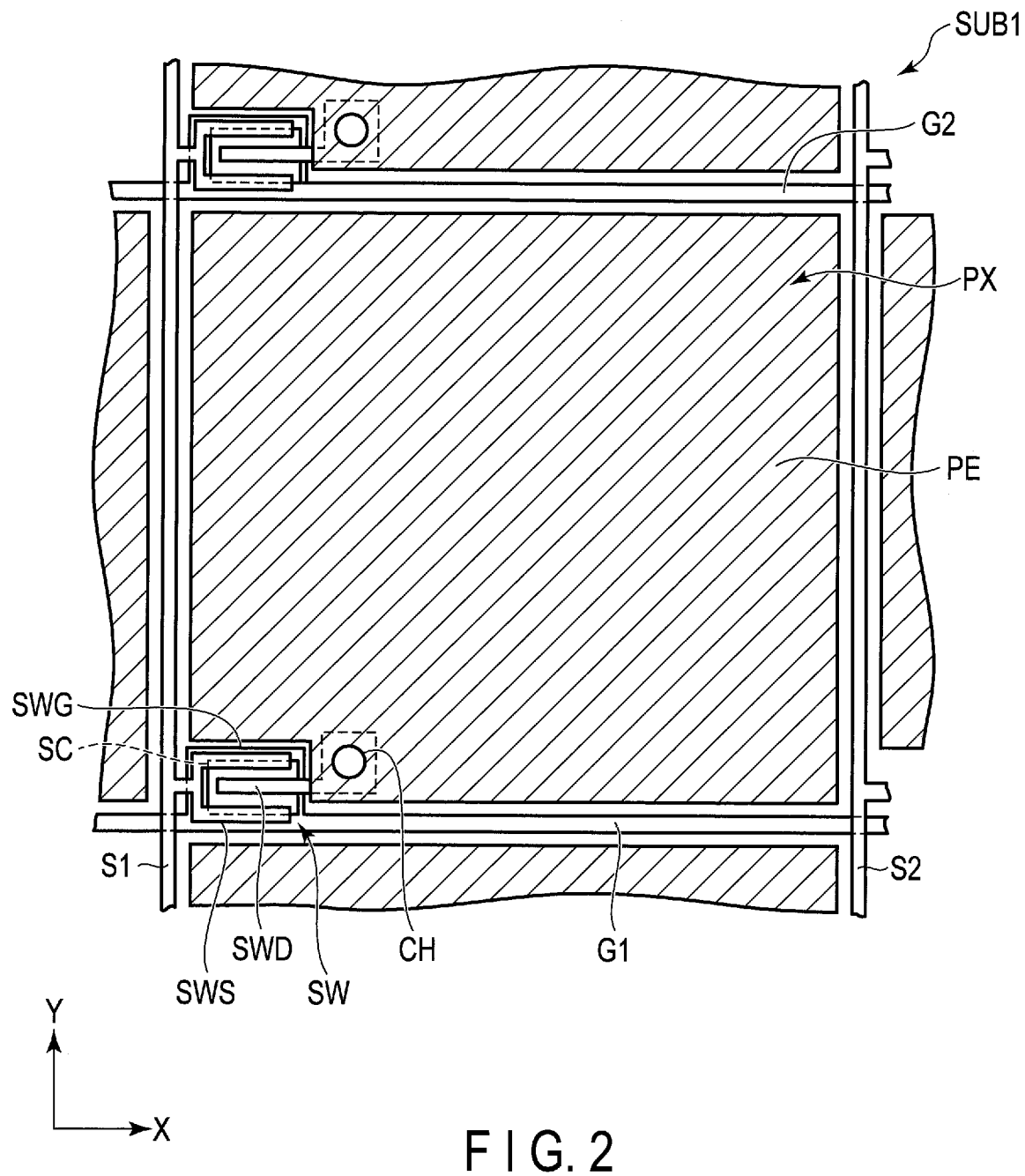
FIG. 2 is a plan view showing an example of a pixel PX shown in FIG. 1.

FIG. 2 is a plan view showing an example of the pixel PX shown in FIG. 1. The first substrate SUB1 includes scanning lines G1 and G2, signal lines S1 and S2, the switching element SW and the pixel electrode PE.

The scanning lines G1 and G2 are spaced apart from each other and are arranged in the second direction Y. The signal lines S1 and S2 cross the scanning lines G1 and G2, and are spaced apart from each other and are arranged in the first direction X. Here, it is assumed that the extension direction of the scanning lines G1 and G2 is the first direction X and the extension direction of the signal lines S1 and S2 is the second direction Y. The pixel PX shown in FIG. 2 corresponds to an area defined by the scanning lines G1 and G2 which are adjacent to each other and the signal lines S1 and S2 which are adjacent to each other.

The switching element SW is disposed in a portion in which the scanning line G1 and the signal line S1 cross each other. The switching element SW includes a semiconductor layer SC. The semiconductor layer SC overlaps a gate electrode SWG which is integrally formed with the scanning line G1. A source electrode SWS which is integrally formed with the signal line S1, and a drain electrode SWD are electrically connected to the semiconductor layer SC. The pixel electrode PE is disposed between the scanning lines G1 and G2 and between the signal lines S1 and S2. The pixel electrode PE overlaps the drain electrode SWD and is electrically connected to the switching element SW via a contact hole CH.

Figure 3:
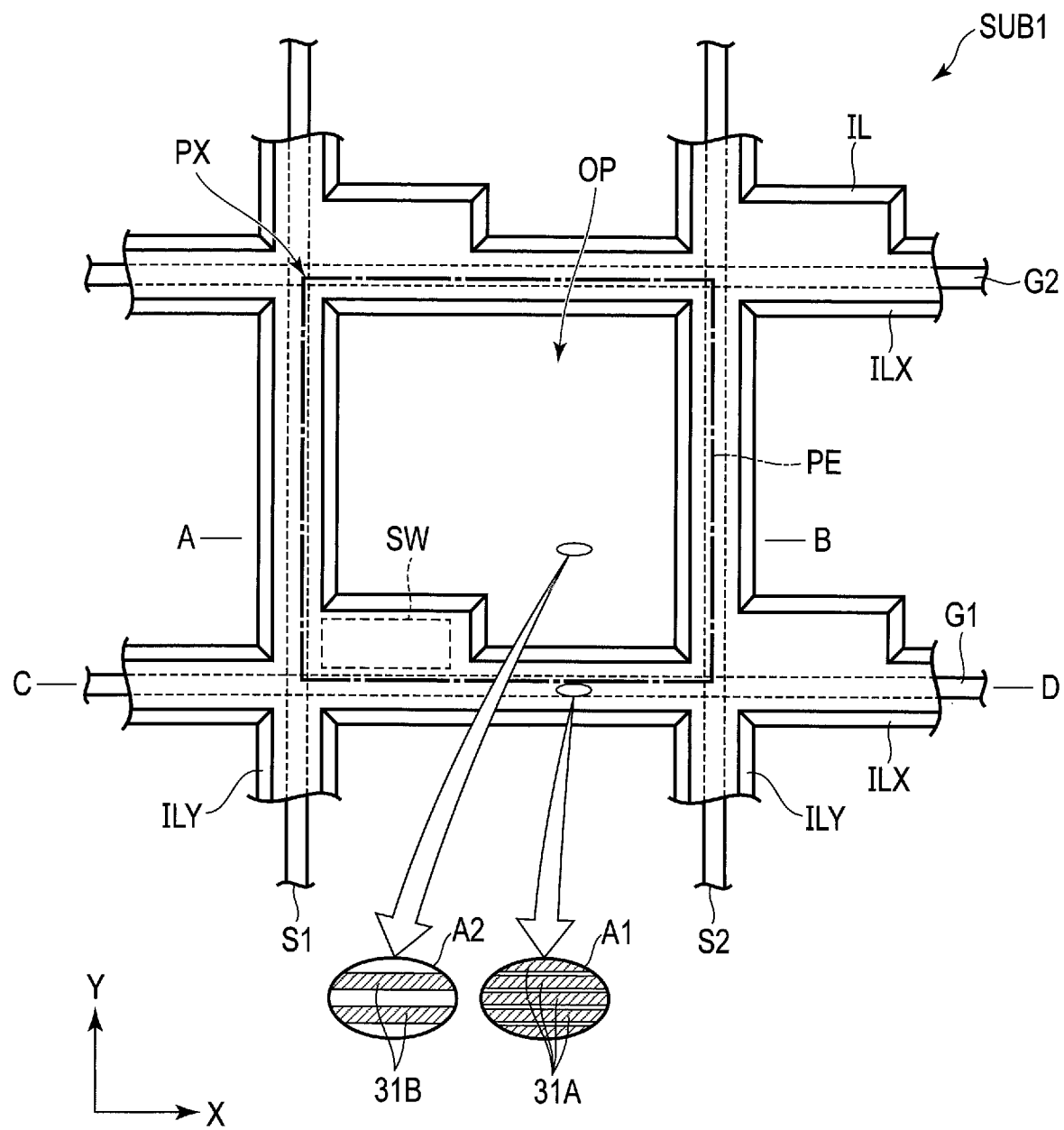
FIG. 3 is a plan view showing an example of an insulating film IL disposed in a first substrate SUB1 shown in FIG. 2.

FIG. 3 is a plan view showing an example of an insulating film IL disposed in the first substrate SUB1 shown in FIG. 2. The insulating film IL has the shape of a grip which defines openings OP, respectively, in the pixels PX. That is, the insulating film IL has portions ILX extending in the first direction X and portions ILY extending in the second direction Y. The insulating film IL overlaps the scanning lines G1 and G2, the signal lines S1 and S2 and the switching element SW. In FIG. 3, the pixel electrode PE indicated by a dot-dash line is disposed so as to overlap the opening OP. The periphery of the pixel electrode PE overlaps the portions ILX and the portions ILY. The contact hole CH shown in FIG. 2 is formed in the opening OP. The insulating film IL is, for example, an organic insulating film but may be an inorganic insulating film.

When planarly viewed in the X-Y plane, a polymer in a first area A1 overlapping the scanning line G1 which is an example of a wiring line or a polymer in a first area A1 overlapping the insulating film IL among the polymers 31 in the liquid crystal layer LC corresponds to a first polymer 31A shown in an enlarged view within FIG. 3. A polymer in a second area A2 overlapping the pixel electrode PE or a polymer in a second area A2 overlapping the opening OP corresponds to a second polymer 31B shown in an enlarged view within FIG. 3. The density of the first polymer 31A is higher than the density of the second polymer 31B. The first polymer 31A and the second polymer 31B are formed of the same material. That is, the first polymer 31A and the second polymer 31B are formed of the same monomer.

The density of each of the first polymer 31A and the second polymer 31B here is defined by the number of stripe-shaped polymers per unit area or the total length of stripe-shaped polymers per unit area when the liquid crystal layer LC is planarly viewed in the X-Y plane.

Note that the density of the present embodiment may be defined by the number of stripe-shaped polymers per unit area or the total length of stripe-shaped polymers per unit area when the liquid crystal layer LC is cross-sectionally viewed in an X-Z plane or a Y-Z plane. Alternatively, the density of the present embodiment may be defined by the number of stripe-shaped polymers per unit volume, the total length of stripe-shaped polymers per unit volume or the volume of stripe-shaped polymers per unit volume.

Figure 4:
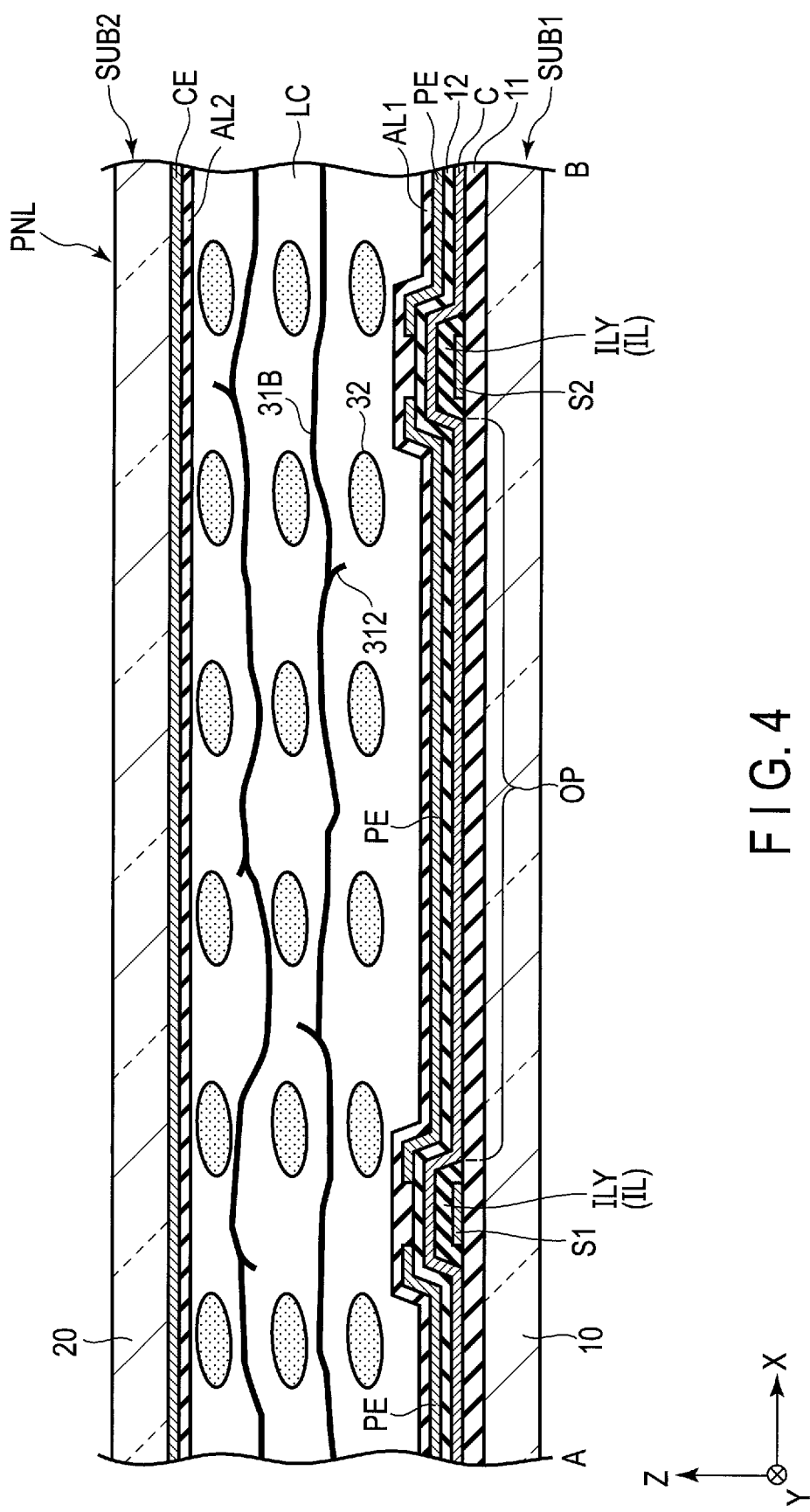
FIG. 4 is a cross-sectional view showing an example of a display panel PNL along line A-B including a second area A2 shown in FIG. 3.

FIG. 4 is a cross-sectional view showing an example of the display panel PNL along line A-B including the second area A2 shown in FIG. 3.

The first substrate SUB1 includes a transparent substrate (first transparent substrate) 10, insulating films 11 and 12, the signal lines S1 and S2, the insulating film IL, a capacitance electrode C, the pixel electrode PE and an alignment film AL1. The insulating film 11 is disposed on the upper surface of the transparent substrate 10. The signal lines S1 and S2 are disposed on the insulating film 11 and are covered with the portions ILY of the insulating film IL. The capacitance electrode C is disposed on the insulating film 11 in the opening OP and is covered with the insulating film 12. In addition, the capacitance electrode C overlaps the portions ILY and face the signal lines S1 and S2. The capacitance electrode C is in contact with the insulating film 11 and the insulating film IL. The pixel electrode PE is disposed on the insulating film 12 in the opening OP and is covered with the alignment film AL1. That is, the capacitance electrode C is disposed between the transparent substrate 10 and the pixel electrode PE. The pixel electrode PE faces the capacitance electrode C via the insulating film 12 and forms the capacitance CS of the pixel PX. The contact hole CH shown in FIG. 2 penetrates the insulating film 12. The alignment film AL1 is in contact with the liquid crystal layer LC.

The second substrate SUB2 includes a transparent substrate (second transparent substrate) 20, the common electrode CE and an alignment film AL2. The common electrode CE is disposed on the main surface of the transparent substrate 20 and is covered with the alignment film AL2. In the second substrate SUB2, a light-shielding layer may be disposed at positions located directly above the switching element SW, the scanning line G and the signal line S, respectively. In addition, a transparent insulating film may be disposed between the transparent substrate 20 and the common electrode CE or between the common electrode CE and the alignment film AL2. The common electrode CE faces the pixel electrodes PE. In addition, the common electrode CE is electrically connected to the capacitance electrode C and has the same potential as the capacitance electrode C. The alignment film AL2 is in contact with the liquid crystal layer LC.

The liquid crystal layer LC is disposed between the first substrate SUB1 and the second substrate SUB2. The liquid crystal layer LC contains the stripe-shaped second polymer 31B and the liquid crystal molecules 32.

Figure 5:
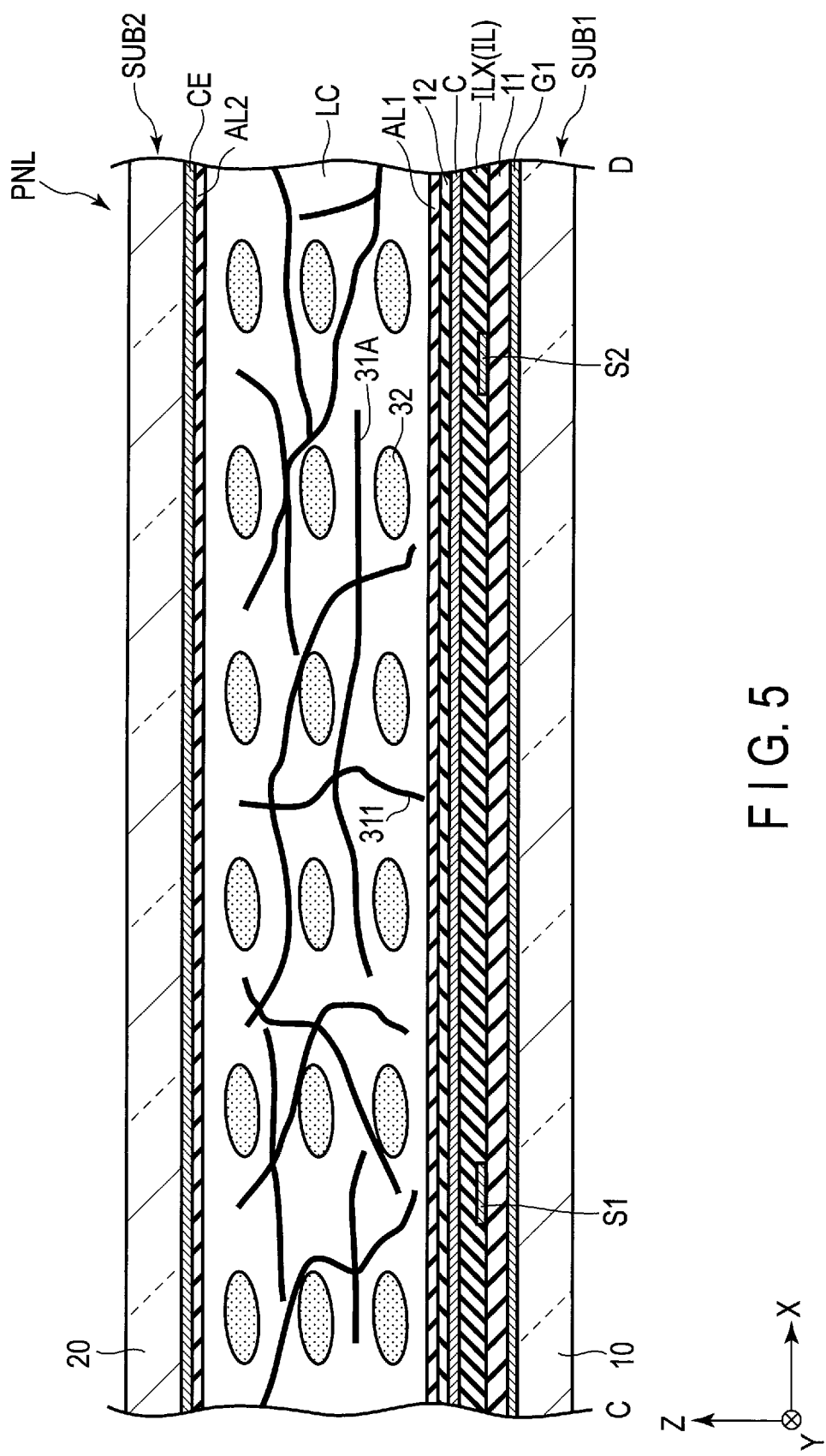
FIG. 5 is a cross-sectional view showing an example of the display panel PNL along line C-D including a first area A1 shown in FIG. 3.

FIG. 5 is a cross-sectional view showing an example of the display panel PNL along line C-D including the first area A1 shown in FIG. 3. The first substrate SUB1 further includes the scanning line G1. The scanning line G1 is disposed on the upper surface of the transparent substrate 10 and is covered with the insulating film 11. The portion ILX of the insulating film IL is disposed directly above the scanning line G1. The portion ILX is disposed on the insulating film 11. The capacitance electrode C overlaps the portion ILX. That is, the insulating film 11 and the insulating film IL are interposed between the scanning line G1 and the capacitance electrode C. In addition, the insulating film IL is interposed between the signals S1 and S2 and the capacitance electrode C.

As shown in FIGS. 4 and 5, the second substrate SUB2 does not include a light-shielding layer at positions overlapping the scanning line G1 and the signal lines S1 and S2 which are examples of wiring lines, respectively.

The liquid crystal layer LC contains the stripe-shaped first polymer 31A and the liquid crystal molecules 32. As shown in FIGS. 4 and 5, when the liquid crystal layer LC is cross-sectionally viewed in the X-Z plane, the density of the first polymer 31A is higher than the density of the second polymer 31B.

In addition, the first polymer 31A includes a first portion 311 extending in a direction different from the first direction X. The second polymer 31B shown in FIG. 4 includes a second portion 312 extending in a direction different from the first direction X. The first portion 311 here may be part of the stripe-shaped first polymer 31A or may be a portion branching off from the stripe-shaped first polymer 31A. The second portion 312 here may be part of the stripe-shaped second polymer 31B or may be a portion branching off from the stripe-shaped second polymer 31B. The direction different from the first portion X here may be the second direction Y, may be the third direction Z or may be a direction different from the second direction Y and the third direction Z. The density of the first portion 311 is higher than the density of the second portion 312. The length of the first portion 311 branching off from a portion extending in the first direction X in the first polymer 31A is greater than the length of the second portion 312 branching off from a portion extending in the first direction X in the second polymer 31B.

The density of each of the first portion 311 and the second portion 312 here is defined by the number of portions per unit area or the total length of portions per unit area when the liquid crystal layer LC is cross-sectionally viewed in the X-Z plane.

Note that the density of the present embodiment may be defined by the number of portions per unit area or the total length of portions per unit area when the liquid crystal layer LC is planarly viewed in the X-Y plane. Alternatively, the density of the present embodiment may be defined by the number of portions per unit area or the total length of portions per unit area when the liquid crystal layer LC is cross-sectionally viewed in the Y-Z plane. Alternatively, the density of the present embodiment may be defined by the number of portions per unit volume, the total length of portions per unit volume or the volume of portions per unit volume.

Each of the transparent substrates 10 and 20 is an insulating substrate such as a glass substrate or a plastic substrate. The insulating film 11 is, for example, a transparent inorganic insulating film of silicon oxide, silicon nitride, silicon oxynitride or the like. The insulating film IL is, for example, a transparent organic insulating film of acrylic resin or the like. The insulating film 12 is a transparent inorganic insulating film of silicon nitride or the like. Each of the capacitance electrode C, the pixel electrode PE and the common electrode CE is a transparent electrode formed of a transparent conductive material such as indium tin oxide (ITO) or indium zinc oxide (IZO). Each of the alignment films AL1 and AL2 is a horizontal alignment film having an alignment restriction force substantially parallel to the X-Y plane. For example, the alignment films AL1 and AL2 are subjected to alignment treatment in the first direction X. Note that the alignment treatment may be rubbing treatment or may be photoalignment treatment.

Figure 6:
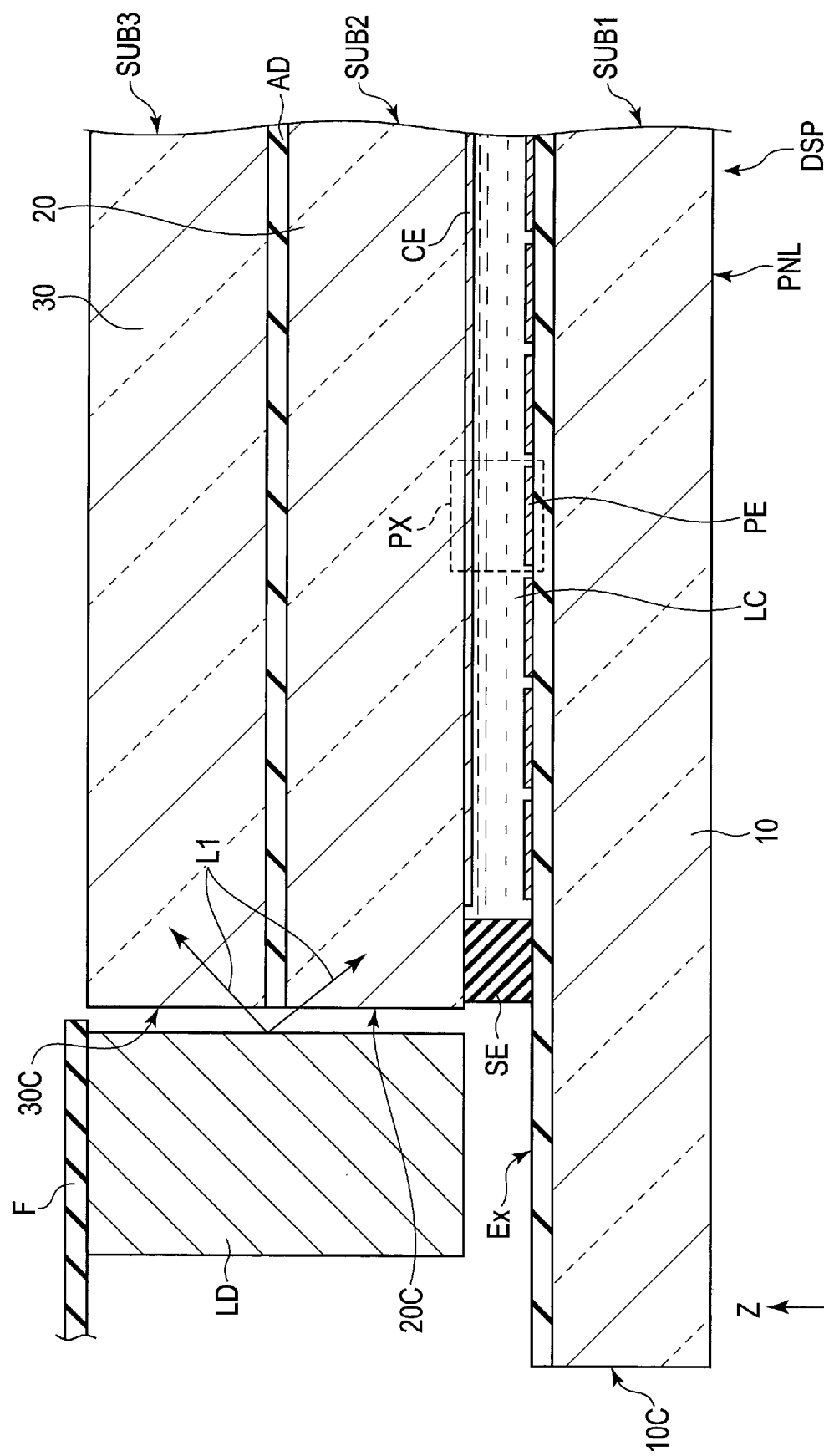
FIG. 6 is a cross-sectional view showing an example of the display device DSP of the present embodiment.

FIG. 6 is a cross-sectional view showing an example of the display device DSP of the present embodiment. With regard to the display panel PNL, only main parts of it are illustrated in the drawing.

In the first substrate SUB1, the pixel electrode PE is disposed for each pixel PX. In the second substrate SUB2, the common electrode CE is disposed over the pixels PX and faces the pixel electrodes PE in the third direction Z.

A transparent substrate 30 is bonded to the transparent substrate 20 by a transparent adhesive layer AD. The transparent substrate 20 is located between the liquid crystal layer LC and the transparent substrate 30 in the third direction Z. Note that the transparent substrate 30 may be omitted.

The transparent substrate 30 is an insulating substrate such as a glass substrate or a plastic substrate and has substantially the same refractive index as the transparent substrate 20. The adhesive layer AD has substantially the same refractive index as the transparent substrates 20 and 30. Note that "substantially the same" here is not limited to a case where the refractive index difference is zero but includes a case where the refractive index difference is less than or equal to 0.03.

The transparent substrate 10 has a side surface 100, the transparent substrate 20 has a side surface 20C, and the transparent substrate 30 has a side surface 30C. The side surface 20C corresponds to the end portion E21 of the second substrate SUB2 shown in FIG. 1. The side surface 100, the side surface 20C and the side surface 30C extend in the first direction X. The extension portion Ex corresponds to an area located between the side surface 100 and the side surface 200 in the second direction Y. The side surface 30C is located directly above the side surface 20C.

The light-emitting element LD faces the side surface 20C and the side surface 30C in the second direction Y. The light-emitting element LD is electrically connected to a wiring substrate F. Note that a transparent light guide may be disposed between the light-emitting element LD and the side surfaces 20C and 30C.

Next, light L1 emitted from the light-emitting element LD will be described with reference to FIG. 6.

The light-emitting element LD emits light L1 toward the side surfaces 20C and 30C. The light L1 which is emitted from the light-emitting element LD travels in the direction of an arrow indicating the second direction Y, and enters the transparent substrate 20 from the side surface 20C and enters the transparent substrate 30 from the side surface 30C. The light L1 which enters each of the transparent substrates 20 and 30 travels through the display panel PNL while it is repeatedly reflected. The light L1 which enters the liquid crystal layer LC to which voltage is not applied is transmitted through the liquid crystal layer LC and is hardly scattered in the liquid crystal layer LC. In addition, the light L1 which enters the liquid crystal layer LC to which voltage is applied is scattered in the liquid crystal layer LC. The display device DSP can be observed from the transparent substrate 10 side and can also be observed from the transparent substrate 30 side. In addition, regardless of whether the display device DSP is observed from the transparent substrate 10 side or the display device DSP is observed from the transparent substrate 30 side, the background of the display device DSP can be observed through the display device DSP.

According to the present embodiment, the density of the first polymer 31A shown in FIG. 5 is higher than the density of the second polymer 31B shown in FIG. 4, and the density of the first portion 311 included in the first polymer 31A is higher than the density of the second portion 312 included in the second polymer 31B. As a result, in the first area A1 overlapping a wiring line (for example, a scanning line), the movement of the liquid crystal molecules 32 is more likely to be restricted by the first polymer 31A. Therefore, in the first area A1, the liquid crystal molecules 32 are maintained in an initial alignment state (that is, maintained in a state in which a voltage of less than a threshold value is applied to the liquid crystal layer LC). Consequently, in the first area A1 of the liquid crystal layer LC, a transparent state is maintained, and degradation in display quality by undesired scattering can be suppressed.

In addition, when light emitted from the light-emitting element LD propagates in the second direction Y, a loss of light by undesired scattering can be suppressed.

Furthermore, since undesired scattering in the first area A1 is suppressed, a light-shielding layer overlapping wiring lines can be omitted, and the transmittance of the display panel PNL in a transparent state can be improved.

On the other hand, in the second area A2 overlapping the pixel electrode PE, the movement of the liquid crystal molecules 32 is smooth as compared to the first area A1. Therefore, in the second area A2, the responsiveness to voltage of the liquid crystal molecules 32 is improved.

Figure 7:
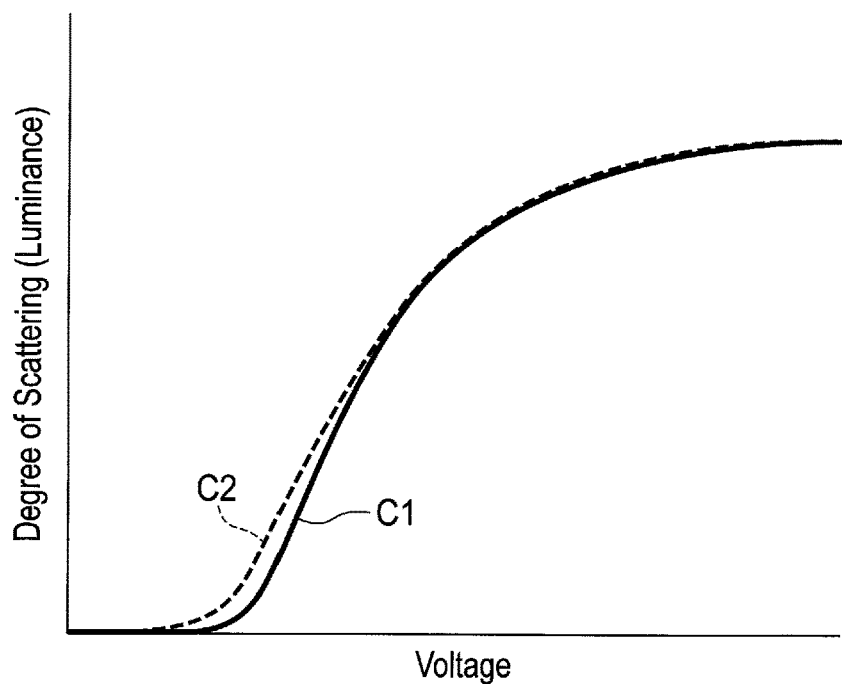
FIG. 7 is a graph showing the relationship between a voltage applied to a liquid crystal layer LC of a comparative example and a degree of scattering (luminance) of the liquid crystal layer LC.

FIG. 7 is a graph showing the relationship between the voltage applied to the liquid crystal layer LC and the degree of scattering (luminance) of the liquid crystal layer LC. Note that FIG. 7 shows the relationship between the voltage and the degree of scattering in a display panel of a comparative example. In a liquid crystal layer provided in the display panel of the comparative example, an area overlapping a pixel electrode PE contains a high-density first polymer 31A as is the case with the first area A1 of FIG. 3.

A solid curve C1 in the graph corresponds to the degree of scattering in a case where the voltage applied to the liquid crystal layer LC is increased to a predetermined value. On the other hand, a dashed curve C2 in the graph corresponds to the degree of scattering in a case where the voltage applied to the liquid crystal layer LC is reduced from the predetermined value.

In both of the curves C1 and C2, the degree of scattering increases as the voltage increases, and the degree of scattering is saturated when the voltage is sufficiently increased. From the perspective of display quality, the curve C1 and the curve C2 should preferably match. However, in the example shown in FIG. 7, the curve C1 and the curve C2 substantially match in a high-voltage region, but the degree of scattering of the curve C2 is higher than the degree of scattering of the curve C1 at the same voltage in a low-voltage region. It is presumed that such hysteresis of responsiveness occurs because the liquid crystal molecules 32 aligned in a direction different from an initial alignment direction by voltage application are restrained by the polymers 31 around the liquid crystal molecules 32, and even when the voltage applied to the liquid crystal layer LC is reduced, the liquid crystal molecules 32 are less likely to be restored to their original alignment states.

Figure 8:
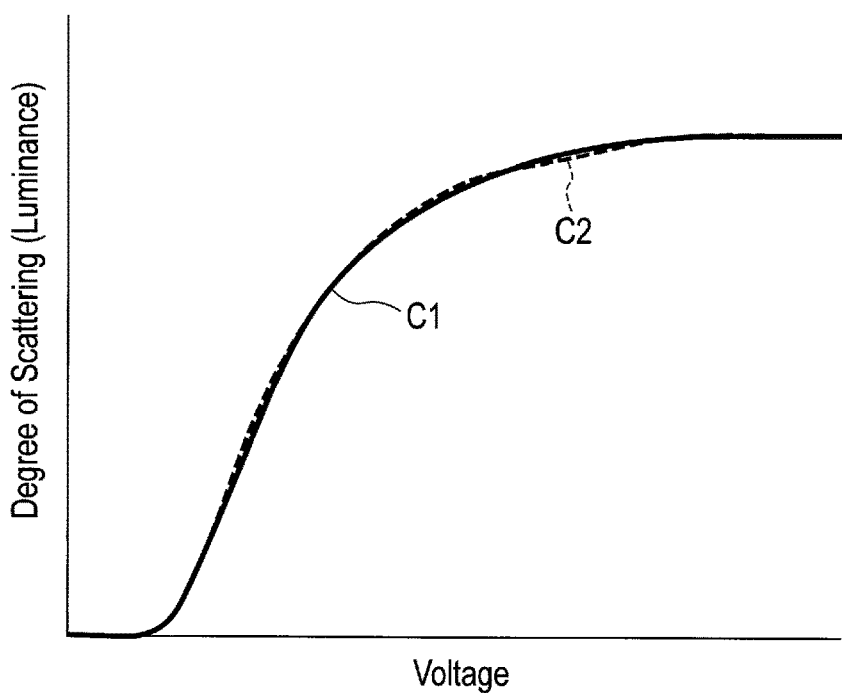
FIG. 8 is a graph showing the relationship between a voltage applied to a liquid crystal layer LC of the present embodiment and a degree of scattering (luminance) of the liquid crystal layer LC.

FIG. 8 is a graph showing the relationship between the voltage applied to the liquid crystal layer LC and the degree of scattering (luminance) of the liquid crystal layer LC. Note that the relationship between the voltage and the degree of scattering in the display panel of the present embodiment is shown in FIG. 8.

According to the present embodiment, it is confirmed that the curve C1 and the curve C2 substantially match from a low-voltage region to a high-voltage region. That is, as described above, in the liquid crystal layer LC in the area overlapping the pixel electrode PE, the density of the polymers 31 around the liquid crystal molecules 32 is not too high to restrain the liquid crystal molecules 32.

Therefore, the liquid crystal molecules 32 aligned in a direction different from an initial alignment direction by voltage application can be quickly restored to their original alignment states when the voltage applied to the liquid crystal layer LC is reduced. Consequently, hysteresis of responsiveness is suppressed. In addition, burn which can be caused by the above-described hysteresis can be suppressed.

As described above, a display device which can suppress degradation in display quality can be provided according to the present embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
    a plurality of light-emitting elements arranged in a first direction;
    a first substrate comprising a first transparent substrate, a wiring line located above the first transparent substrate and extending in the first direction, a switching element electrically connected to the wiring line, and a pixel electrode electrically connected to the switching element;
    a second substrate comprising a second transparent substrate having a side surface facing the light-emitting elements, and a common electrode overlapping the pixel electrode; and
    a liquid crystal layer located between the first substrate and the second substrate, and containing a stripe-shaped polymer extending in the first direction and a liquid crystal molecule, wherein
    the liquid crystal layer contains a first polymer in an area overlapping the wiring line without overlapping the pixel electrode and a second polymer in an area overlapping the pixel electrode without overlapping the wiring line,
    the first polymer and the second polymer are arranged in a second direction crossing the first direction in planar view,
    the stripe-shaped polymer includes the first polymer and the second polymer,
    the first polymer includes a first portion extending in a direction different from the first direction,
    the second polymer includes a second portion extending in a direction different from the first direction,
    a length of the first portion branching off from a portion extending in the first direction in the first polymer is greater than a length of the second portion branching off from a portion extending in the first direction in the second polymer,
    a density of the first portion is higher than a density of the second portion, and
    a density of the first polymer is higher than a density of the second polymer in a planar view.

2. The display device of claim 1, wherein the wiring line is a scanning line extending in the first direction.

3. The display device of claim 1, wherein the second substrate does not comprise a light-shielding layer at a position overlapping the wiring line.

4. The display device of claim 1, wherein the side surface extends in the first direction in planar view.

5. The display device of claim 1, wherein the first polymer and the second polymer are formed of a same material.

* * * * *